United States Patent [19]
Tittman

[11] 3,823,319
[45] July 9, 1974

[54] POROSITY DETERMINATION WITH MUDCAKE CORRECTION

[75] Inventor: Jay Tittman, Danbury, Conn.

[73] Assignee: Schlumberger Technology Corporation, New York, N.Y.

[22] Filed: Mar. 23, 1973

[21] Appl. No.: 344,300

Related U.S. Application Data

[63] Continuation-in-part of Ser. No. 65,876, Aug. 21, 1970, abandoned.

[52] U.S. Cl.............................. 250/265, 250/269
[51] Int. Cl............................................. G01t 1/16
[58] Field of Search .......... 250/265, 266, 270, 268, 250/269

[56] References Cited
UNITED STATES PATENTS

| | | | |
|---|---|---|---|
| 2,778,950 | 1/1957 | Frey, Jr. et al. | 250/268 |
| 3,281,599 | 10/1966 | Baker et al. | 250/268 |
| 3,546,454 | 12/1970 | Schuster | 250/264 |

*Primary Examiner*—James W. Lawrence
*Assistant Examiner*—Davis L. Willis

[57] ABSTRACT

An illustrative embodiment of the invention provides an accurate mudcake correction for sidewall neutron borehole logging tools. A sidewall porosity sonde is equipped with a vertically separated neutron source and a neutron detector that are both eccentered in the tool in order to engage one side of the borehole wall. This basic porosity measuring array is supplemented by a source of lower energy neutrons having appreciably shorter slowing down length and another detector, for appropriately sensing the influence of the mudcake. A circuit combines signals from the detectors to produce an indication of the formation porosity.

7 Claims, 2 Drawing Figures

POROSITY DETERMINATION WITH MUDCAKE CORRECTION

BACKGROUND OF THE INVENTION

1. Field of the Invention

This invention relates to borehole logging techniques and, more particularly, to an earth formation porosity logging apparatus that combines signals from two detectors in response to the neutrons emitted from individual respective sources, and the like.

DESCRIPTION OF THE PRIOR ART

Earth formation porosity or hydrogen concentration data frequently provide the oil industry with information about the potential hydrocarbon production that can be expected from a borehole. Ideally, these data can be acquired through a "sonde" or logging tool that traverses the borehole. A source within the tool emits neutrons that scatter through the adjacent formation. These neutrons lose energy as a consequence of neutron interactions, or collisions, with the nuclei of the constituent formation materials. These energy losses are, to an important extent, a reflection of the relative porosity and apparent abundance of hydrogen within the formation under study.

Some of these lower energy neutrons, after a number of scattering collisions, find their way back to the logging tool and are registered in a neutron detector that is vertically spaced from the emitting source. In the absence of perturbing influences, the signal from the detector provides a measure of the earth formation porosity. There are factors, however, that may degrade or alter the basic measurement. For example, the fluid or mud that often is used to control pressure within the borehole and to flush out the drill cuttings frequently imposes a strong influence on the basic neutron spatial distribution.

Illustratively, the hydrostatic mud pressure in the borehole is slightly greater than the natural pressure within the formation. This pressure differential not only prevents formation fluids from discharging into the well, but also causes the liquid constituents in the mud to seep into the formation and deposit a film or residue of solid matter on the borehole wall. This residue, or mudcake, affects the spatial distribution of the low energy neutrons to a degree that often obscures the characteristics of the formation and thus degrades the validity of the neutron log.

Clearly, there is a need for an improved mudcake correction technique

SUMMARY OF THE INVENTION

In accordance with the invention, an improved mudcake correction is obtained through the addition of an auxiliary neutron source and detector to a neutron logging tool. More specifically, the auxiliary or supplementary source emits neutrons that are characterized by a low energy in order to increase the probability for neutron interaction within the mudcake. For example, a source suitable in this connection will emit neutrons that produce a slowing down length that is of the order of magnitude of the thickness of a typical mudcake, or a slowing down length that is appreciably less than the length characterizing the neutrons emitted from the primary source. Because the slowing down length of primary source neutrons in most formations is about 10 to 30 cm, an auxiliary neutron source in accordance with the invention will provide neutrons characterized by a length of about 3 to 10 mm, depending on the mudcake quality. In order to enhance the quality of the mudcake observation, the auxiliary detector is positioned, in relation to the supplementary source, to respond almost exclusively to those neutrons that are emitted from that source.

Preferably, the auxiliary detector is further limited in response to epithermal neutrons, i.e., those neutrons that have energies greater than the average thermal kinetic energy of the molecules in the scattering medium. This energy limitation is imposed because neutrons that are in thermal equilibrium are affected by extraneous properties of the mudcake, rather than by significant characteristics of the mudcake, as for example, the layer thickness and porosity.

A source of low energy neutrons, suitable for use in the invention, available through the reaction of beryllium to the photons that are naturally emitted from antimony. This combination produces almost monoenergetic 25 KeV photoneutrons, a neutron energy so low that probability of interaction with the material very close to the borehole wall is quite high. By choosing a low energy source, and thus effectively limiting the depth of neutron investigation to the mudcake and its immediate surroundings, the number of epithermal neutrons from this source that find their way back to the auxiliary detector generally reflect the significant mudcake features.

A further characteristic of the invention provides a circuit that automatically combines signals from the auxiliary neutron detector and the signals from another detector or detectors that are acquired during the same or during a different logging run. Preferably, this circuit converts all of the signals into an output that is related to porosity or some other useful earth formation parameter.

More particular, the auxiliary epithermal neutron detector and neutron source are relatively closely spaced in a logging tool housing. Within the same housing, or in another sidewall skid attached to the same tool, a substantially higher average neutron energy source (americium-beryllium or plutonium-beryllium, for example) is spaced about 15 or more inches from an associated principal neutron detector. This latter source and detector combination explores the formation as well as the mudcake. In this regard, the signal from the detector associated with high energy neutron source is representative of the mudcake and the formation, while the auxiliary detector signal predominantly characterizes the mudcake. The computation system contrasts the signals from both of these detectors to eliminate mudcake effects and thereby produce an output that is more closely related to the actual formation porosity than the output of the principal detector, alone.

For a better understanding of the present invention, reference is had to the following description taken in connection with the accompanying drawing, the scope of the invention being pointed out in the appended claims.

DESCRIPTION OF THE PREFERRED EMBODIMENTS

Figure 1:
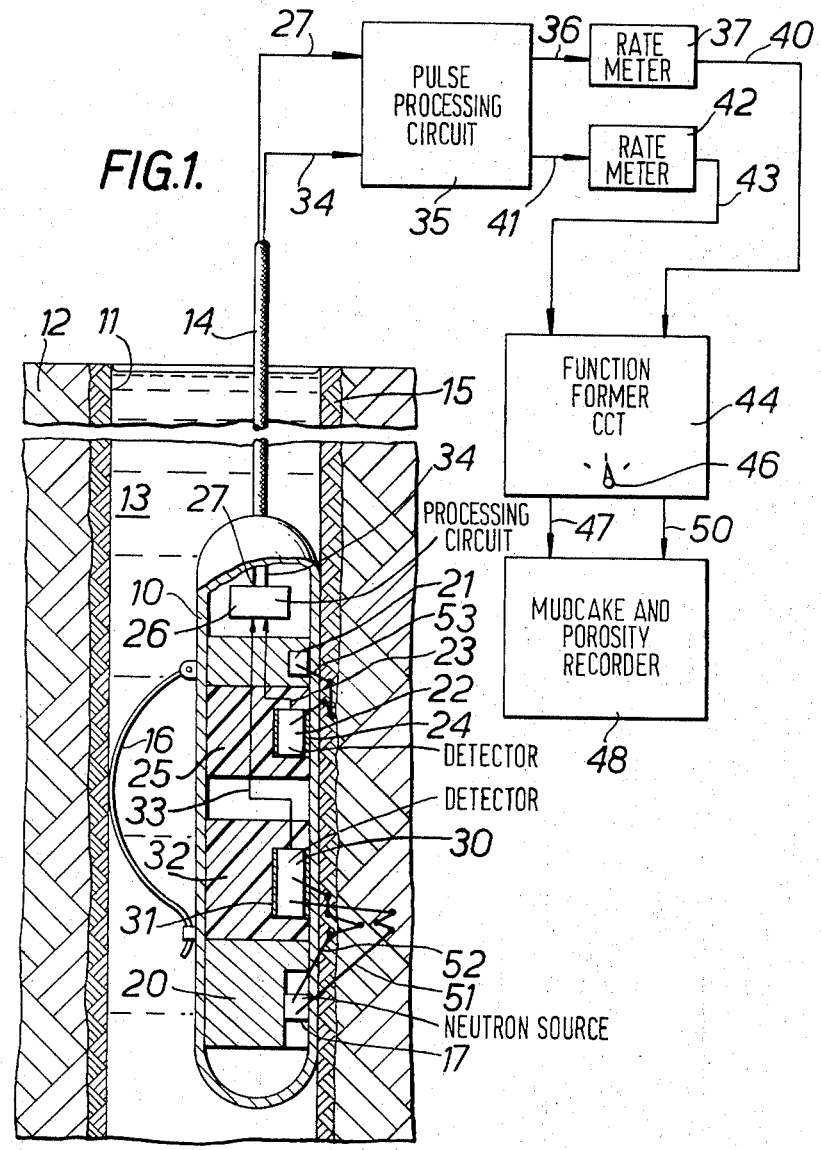
FIG. 1 is a schematic diagram of a logging tool exemplifying principles of the invention.

For a more complete appreciation of the invention, FIG. 1 shows a logging tool. The tool includes a fluid-tight housing 10 that is lowered into and drawn upwardly through a borehole 11 which has been drilled through an earth formation 12. Illustratively, the borehole 11 is filled with a drilling mud 13. Vertical movement of the housing 10 is controlled through an armored cable 14 and a winch (not shown) on the earth's surface. Measurement equipment (also not shown) associated with the winch provides an indication of the depth of the housing 10 within the borehole 11. In this manner, a log of some characteristic earth formation parameter is produced as a function of the borehole depth.

In order, for example, to measure more accurately the porosity of the earth formation 12, the housing 10 is urged against a film or layer of mud or mudcake 15 on one side of the borehole 11. The force urging the housing 10 against the mudcake 15 is applied through a bowspring 16. Other suitable eccentering means, for instance a spring-loaded hydraulic system, also can be used for this purpose.

A neutron source 17 is positioned in the lowermost portion of the housing 10), preferably on the side of the housing that engages the mudcake 15. For porosity logging purposes, a mechanical mixture of beryllium and one of the plutonium isotopes (plutonium 238 or plutonium 239, for example) in sufficient quantity to provide a $10^7$ neutrons per second source has been found suitable.

Because the neutrons emitted from sources of this type have an average energy of about 5 million electron volts (MeV), a high energy neutron reflector 20 is interposed between the source 17 and those portions of the housing 10 that are not pressed against the mudcake 15. Preferably, the reflector 20 is formed of a material that has a large scattering probability or cross-section for high energy neutrons. Copper or steel are adequate for this purpose.

The reflector 20 redirects toward the formation 12 those neutrons that are emitted from the source 17 in a direction that tends to take them away from the adjacent portion of the borehole wall. The reflector 20 prevents neutrons being absorbed in the drilling mud 13 and thus conserves neutrons to increase the statistical validity of the detector signal as subsequently described.

In accordance with one aspect of the invention, a supplementary or auxiliary neutron source 21 is positioned within the housing 10 and adjacent to the housing side that is pressed into contact with the borehole wall. The source 21, moreover, is in general vertical alignment with the neutron source 17. The neutrons emitted from the source 21 are of appreciably lower energy than those emitted from the source 17, As an illustrative embodiment, the 25 KeV neutrons that characterize the antimony-beryllium photoneutron reaction are especially well suited to the shallow penetration required for sampling the influence of the mudcake 15. The auxiliary neutron source 21 also can be equipped with a neutron reflector or scattering shield (not shown) for the same purpose as that which was described in connection with the reflector 20.

A neutron detector 22 is positioned within the housing 10. The detector 22 preferably has a small active volume that is filled with a neutron-responsive gas, e.g., boron trifluoride or helium 3 ($He^3$). Typically, the detector 22 responds to the neutrons from the auxiliary source 21 that make their way back toward the housing 10 by scattering collisions in the mudcake 15. Charged particles are produced in the counter gas through neturon reactions. These reactions produce ionization which establishes an electrical charge in an output conductor 23.

In order to limit the sensitivity of the detector 22 to epithermal neutrons and thereby overcome the effect the saline water on the observed neutron distribution, the detector 22 is encased in a sheath 24, typically of cadmium. The cadmium essentially absorbs all of the incident thermal neutrons to prevent them from entering the active volume of the detector 22. Thus, the response from the detector 22 represents only those neutrons that make their way back to the housing 10 with energies greater than thermal.

The response of the detector 22 is further reduced through neutron shielding 25 that is interposed between the detector 24 and those portions of the housing 10 that are not in contact with the mudcake 15. The neutron shield 25, formed of boron carbide, for example, absorbs substantially all of the otherwise detectable neutrons that approach the detector 24 from directions other than the portion of the mudcake 15 or borehole wall that is in engagement with the housing 10. In this manner, the influence of the borehole fluid on the neutron distribution that is registered in the detector 22 is to a large degree reduced in significance.

Signals from the detector 22, sent through the output conductor 23, are conditioned in a downhole processing circuit 26 for transmission to the earth's surface through an insulated condutor 27 in the armored cable 14. Typically, the downhole processing circuit 26 includes scaling circuits to reduce the detector pulses by a constant divisor and ease the signal transmission burden on the cable 14. The circuit also preferably includes one or more pulse height discriminators to eliminate noise, and an amplification system to enable the scaler output pulses to travel through several thousand feet of the cable 14 and arrive at the earth's surface in a recognizable condition.

A second neutron detector 30 is spaced vertically above the high average neutron energy source 17 by about 15 inches. Typically, the detector 30 comprises a tube filled with $He^3$ to a pressure of about 10 atmospheres when measured at standard conditions.

For essentially the same reasons as those which were advanced in connection with the detector 22, the detector 30 is positioned within the housing 10 against the housing side that is urged into contact with the mudcake 15. The detector 30 also is encased in a thermal neutron absorption sheath 31 and is partially encircled by a neutron absorbing shield 32 that is interposed between the detector 30 and those portion of the housing 10 that are not pressed against the mudcake 15.

The detector 30 responds to epithermal neutrons that are scattered from the formation 12 through the generation of charge pulses in an output conductor 33. These pulses are received in the downhole processing circuit 26. The circuit 26 processes or conditions the pulses for transmission to the earth's surface through an insulated conductor 34 in the armored cable 14.

On the earth's surface, the signals from the detectors 22 and 30 in the conductors 27 and 34, respectively, are received in a pulse processing circuit 35 that distinguishes the respective signals from electrical noise induced in the cable 14 during transmission, and reconditions these pulses for further manipulation or processing.

The reconditioned signals from the detector 22 are sent from the pulse processing circuit 35, through a conductor 36 to a pulse counting rate meter 37. The meter 37 integrates the input pulses to produce an output signal in a conductor 40 that is representative of the mean value of the time distribution of these pulses (detector counts per second, for example). In a similar manner, signals from the detector 30 are sent from the processing circuit 35 through a conductor 41, to a neutron detector pulse counting rate meter 42.

The count rate signal from the meter 42 is sent through a conductor 43 to a function former circuit 44. The function former circuit 44 combines the count rate from the detector 22, predominantly influenced by the mudcake, that is received in the form of the rate signal in the conductor 40, with the porosity and mudcake count rate from the detector 30 in the conductor 43, in order to identify the porosity of the formation 12.

Figure 2:
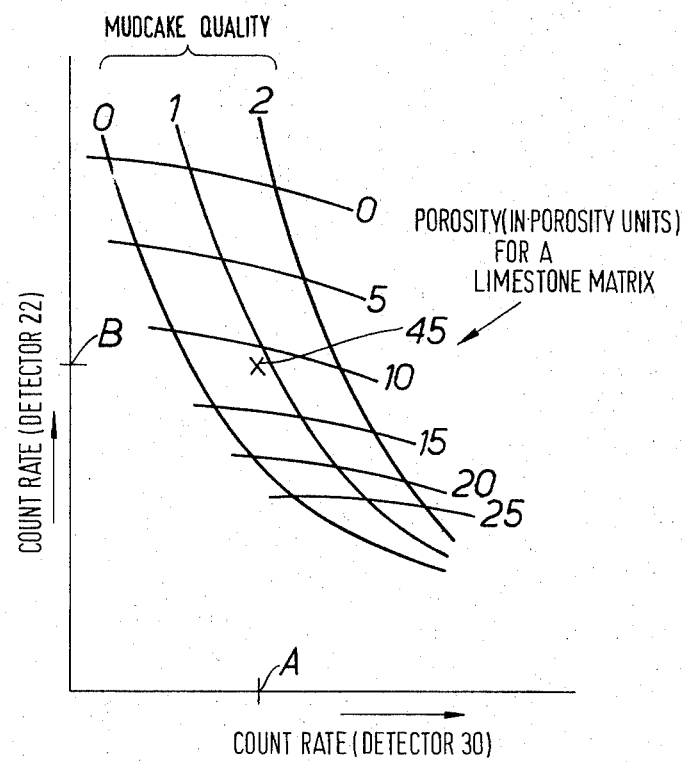
FIG. 2 is a generalized graph of the responses that characterize the detectors shown in the illustrative embodiment of the invention.

Illustratively, for a specific formation mineral composition, the function former circuit 44 combines the count rates that characterize the detectors 22 and 30 according to the generalized relation that is shown in FIG. 2. In this connection, for a limestone mineral composition, a count rate A from the detector 30 and the rate meter 42, and count rate b from the detector 22 and the associated rate meter 37 identify a point 45. The point 45 corresponds to a formation porosity of about eleven porosity units and a mudcake parameter or quality factor slightly less than one. This quality factor is an arbitrarily assigned value that is based on empirically developed data that combine, for example, the mudcake thickness and mudcake porosity in order to provide a compensatory relation for a particular logging environment. These relations, of the sort illustrated in FIG. 2, may be derived, for example, through extensive tests executed in formation of known porosity and mineral composition as well as with known mudcake characteristics. These observed data then are compiled in the form of graphs or data tables which, for a given mineral, will relate specific porosity and mudcake quality combinations to particular detector count rates. Alternatively, or as a supplement, these data can be acquired through tests conducted in laboratory formations of established characteristics and with simulated mudcakes.

Turning once more to FIG. 1, a typical function former circuit capable of producing in electrical response the properties of the graph in FIG. 2, preferably comprises an operational amplifier and a diode-resistance resistance feedback network. Responses for the function former circuit 44 that are appropriate to different formation mineral compositions, as for example, dolomite and sandstone, can be chosen through a manual selection switch 46. Typically, the switch 46 will permit the diode-resistance feedback network appropriate to the mineral composition of the formation undergoing irradiation to be coupled to the operational amplifier in order to establish output signals that are commensurate with the input signals. The specific earth formation mineral composition that is under observation in a particular situation can be determined, for example, through an examination of drill cuttings.

Automatic techniques can be used to supplant the mineral selection switch 46. For instance, the signals from the detectors 22 and 30 can be stored on tape for subsequent manipulation in accordance with the principles of the invention, or if convenient, applied directly to a digital computer that combines other diverse logging signals to produce output data of industrial importance.

Continuing with FIG. 1, the mudcake parameter signal is sent through a conductor 47 to a recorder 48. The porosity signal also is sent to the recorder 48 through a conductor 50 in order to provide a record of mudcake parameter and earth formation porosity as a function of borehole depth. This record, although often presented in the form of a graph or chart, also can be stored on magnetic or paper tape, punched cards, and the like, for further processing as a part of a larger log analysis system as hereinbefore described in connection with the signals from the detectors 22 and 30.

A log of the mudcake parameter and earth formation porosity, produced in accordance with the principles of the invention, also provides a useful indication of the degree to which the pores within the formation 12 are interconnected. This information, usually known as permeability, is a measure of the relative ease with which fluids can be extracted from the formation. For instance, in some cases, a thick mudcake indicates a highly permeable rock structure because the mud filtrate is able to invade the formation with apparent ease and deposit a relatively thick residue on the borehole wall. Accordingly, a thick mudcake adjacent to a highly porous formation may be of industrial importance as a zone of further investigation for potential hydrocarbon production.

The relative positive position of the auxiliary source 21 and the associated detector 22 with respect to the positions of the source 17 and the detector 30, can be chosen in accordance with specific circumstances and design optimization criteria. For instance, neutron source 21 can be secured in a convenient location within the housing 10, in a separate skid, on a different logging tool for use in a separate logging run. The strength of the auxiliary source 21 can be optimized for specific logging conditions.

Typically, the separation between the auxiliary detector 22 and the neutron source 17 should be sufficient to reduce to a negligible amount the count in that detector from neutrons that originate at the source 17. In a similar manner the detector 30 should be spaced far enough from the auxiliary source 21 to produce a minimum signal in response to the neutrons that are attributable to that source. Actual separations between sources and the detectors can be determined through optimization for specific mudcake and porosity conditions, Illustratively, one of the sources can be removed and the detector position within the sonde can be varied until the undesired neutron signal reaches a minimum. The removed source can be replaced and the other source taken from the tool while the position of the remaining detector is varied to determine the separation that is appropriate to the minimum undesired neutron signal.

In operation, a neutron 51 is emitted from the source 17 and collides with a nucleus in the earth formation 12. As a consequence of the collision, the neutron transfers some of its energy to the nucleus and is scattered in a new direction. It is then scattered again, with energy loss. This process is repeated many times. Eventually, incident neutron 51 enters the detector 30 and is registered as an individual event. The number of these vents tend to characterize, for example, the hydrogen concentration or the porosity of the formation 12. Another neutron 52, also emitted from the source 17, eventually diffuses into the active volume of the detector 30 principally through collisions with mudcake nuclei. Consequently, in the illustrative example, the signal generated by the detector 30 combines formation and mudcake information.

Because of the low source emission energy, however, a neutron 53 from the auxiliary source 21 penetrated not much deeper than the mudcake 15. The neutron 53 is multiply scattered back toward the active volume of the supplementary detector 22. Clearly, the signal from the detector 22 is limited almost entirely to mudcake information. In accordance with a feature of the invention, these two detectors signals are combined to segregate the porosity contribution from the composite mudcake and porosity output that characterizes the neutron detector 30.

I claim:

1. A well logging tool for determining a characteristic of an earth formation surrounding a borehole that has a layer of material between said formation and borehole which has a disturbing influence on the determination of the characteristic of the earth formation comprising:
   a. neutron generating source means adapted for generating high energy neutrons having energies sufficient to penetrate in a substantial numbers beyond the material of disturbing influence and into the formation, said source means also adapted to generate low enegy neutrons having energies sufficiently low to penetrate said material of disturbing influence in substantial numbers and said earth formation in relatively insubstantial numbers;
   b. a first detector adapted to respond primarily to the initially high energy neutrons to produce a first signal;
   c. a second detector adapted to respond primarily to the initially low energy neutrons to produce a second signal; and
   d. means for combining said first and second signals to produce an output signal representative of the characteristic of the earth formation and a second output signal representative of the material of disturbing influence.

2. The apparatus of claim 1 wherein the detectors are responsive to substantially only neutrons of epithermal energy.

3. The apparatus of claim 1 wherein the characteristic of the earth formation is the formation porosity.

4. The apparatus of claim 1 wherein the material of disturbing influence is a layer of mudcake formed on the borehole wall.

5. The apparatus of claim 1, wherein said neutron generating source means comprises two spaced apart neutron generators which emit neutrons having respectively relatively high and relatively low energies.

6. A method of determining the characteristic of an earth formation surrounding a borehole that has a layer of material between said formation and borehole that has a disturbing influence on the determination of the characteristic of the earth formation comprising:
   a. generating high energy neutrons having energy sufficient to penetrate in substantial numbers beyond the material of disturbing influence and into the formation;
   b. generating low energy neutrons having energy sufficiently low to penetrate said material of disturbing influence in substantial numbers and said earth formation in relatively insubstantial numbers;
   c. producing a first signal in response primarily to the initially high energy neutrons;
   d. producing a second signal in response primarily to the initially low energy neutrons; and
   e. combining said first and second signals to produce an output signal representative of the characteristic of the earth formation and a second output signal representative of the material of disturbing influence.

7. The method of claim 6 wherein said second signal is produced in response to substantially only neturons of epithermal energy.

* * * * *